United States Patent [19]

Birkhauser

[11] Patent Number: 4,654,757
[45] Date of Patent: Mar. 31, 1987

[54] ADJUSTABLE AUXILIARY VEHICLE LIGHT
[75] Inventor: Robert R. Birkhauser, Verona, Wis.
[73] Assignee: Creative Design Technologies, Ltd., Madison, Wis.
[21] Appl. No.: 792,337
[22] Filed: Oct. 29, 1985
[51] Int. Cl.⁴ .............................................. B60Q 1/00
[52] U.S. Cl. ...................................... 362/61; 362/80; 362/287; 362/294; 362/373; 340/87
[58] Field of Search ............... 362/61, 285, 294, 311, 362/218, 373, 269, 387, 371, 285, 282, 285, 277, 269, 80, 78; 340/69, 70, 71, 87, 97, 74, 122, 127

[56] References Cited
U.S. PATENT DOCUMENTS

| | | | |
|---|---|---|---|
| 2,227,881 | 1/1941 | Dooley | 362/373 |
| 3,112,076 | 11/1963 | Bobrick | 362/294 |
| 3,379,892 | 4/1968 | Neagle | 362/287 |
| 4,164,784 | 8/1979 | Jackish | 362/371 |
| 4,449,167 | 5/1984 | Cohen | 362/285 |
| 4,463,411 | 7/1984 | Proctor | 362/61 |

FOREIGN PATENT DOCUMENTS 943125 11/1963 United Kingdom ................. 362/373

Primary Examiner—William A. Cuchlinski, Jr.
Assistant Examiner—D. M. Cox
Attorney, Agent, or Firm—Isaksen, Lathrop, Esch, Hart & Clark

[57] ABSTRACT

An adjustable signal light which is attachable to the rear window of a vehicle. The signal light has a bracket with a frame that may be secured to the inside surface of the vehicle rear window by adhesive means, and a pair of spaced side fins which extend from opposed sides of the frame. A lamp housing is rotatably mounted between the bracket side fins and defines a lamp chamber open generally toward the frame opening at a desired angle thereto. A lamp is mounted within the chamber and electrical means connect the lamp to the electrical system of the vehicle. A lens is secured to the housing to enclose the lamp in the lamp housing and refract light from the lamp through the frame opening. A removeable cover is engaged on the bracket to enclose the lamp housing and secure the bracket side fins in locking engagement with the lamp housing to prevent rotation of the lamp housing during use. The cover and lamp housing are removeable from the bracket to permit service of the lamp and electrical components without detaching the bracket from the vehicle window. The lamp housing peripheral wall has an opening in which a metal heat sink is mounted, and a circuit board with logic circuit may be mounted within the housing in proximity to the heat sink. The heat sink conducts heat from the lamp and the logic circuit components within the housing out of the housing. Ventilation openings in the upper and lower portions of the cover permit the flow of air past the housing to remove heat from the signal light.

20 Claims, 10 Drawing Figures

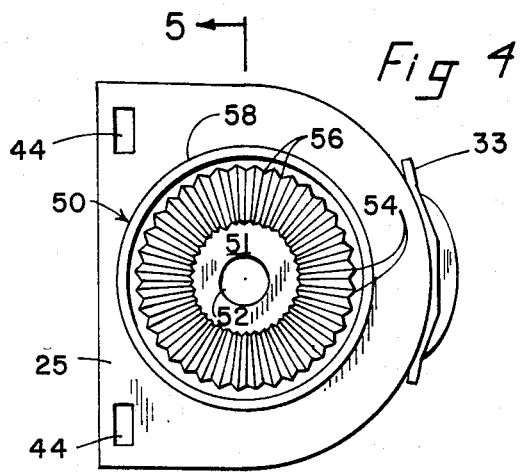
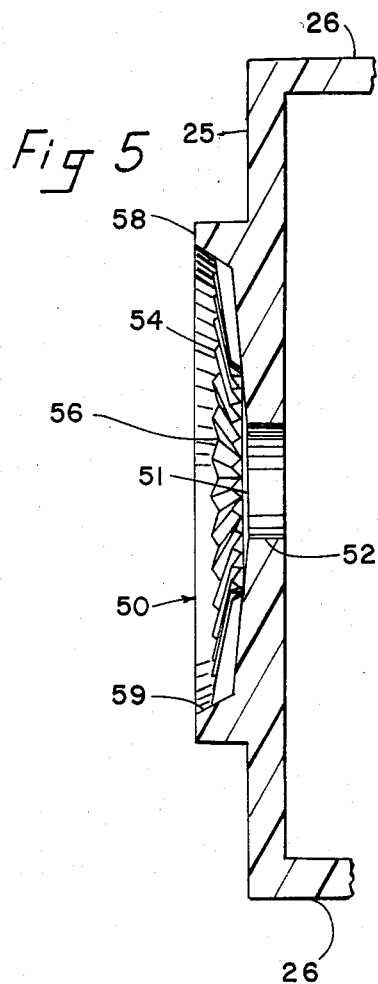
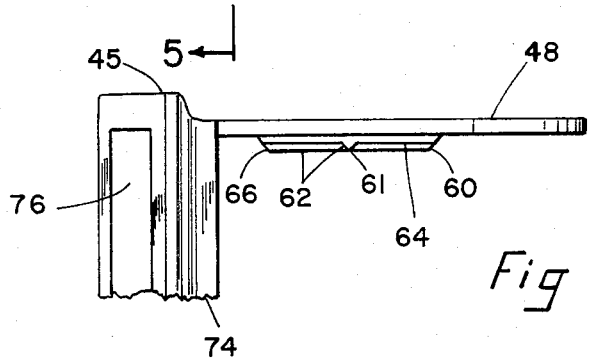
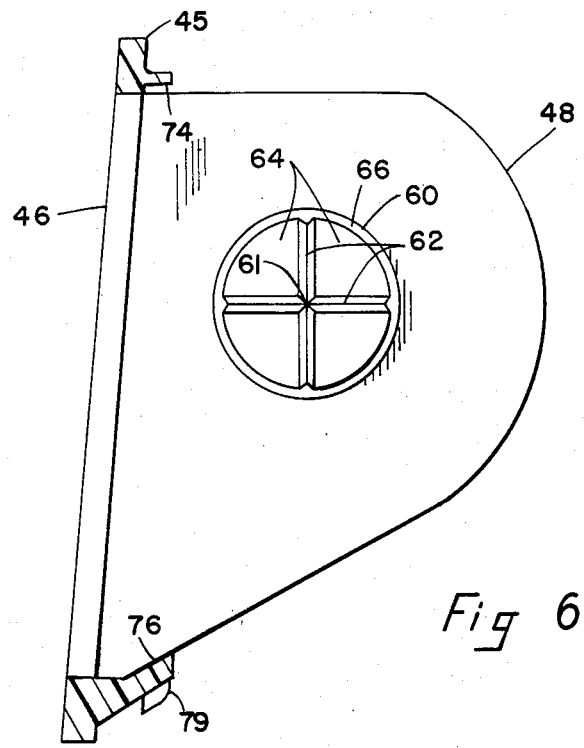

ADJUSTABLE AUXILIARY VEHICLE LIGHT

BACKGROUND OF ART

This invention relates to vehicle signal lights and more particularly to vehicle signal lights adapted to be attached to the vehicle inside the vehicle window.

Vehicle signal lights are necessary safety devices which allow a vehicle driver to alert the drivers of other vehicles. It is particularly important for the driver to warn the drivers of trailing vehicles when the driver is decelerating or stopping. Conventionally, this warning is made through the use of brake lights mounted to the vehicle and visible from behind the vehicle. Some early automobile designs employed rear signal lights that were mounted near the passenger compartment of the vehicle and relatively high off the roadway. Sometimes these lights were mounted within the vehicle and were viewable through the vehicle's rear window. Modern automobiles typically have engine or baggage compartments situated between the passenger area and the signal lights. These compartments are located below the level of the rear window to provide the vehicle occupants with an unobstructed view. Signal lights are typically mounted to the rear end of these compartments and consequently at a relatively low elevation. The effectiveness of these low level signal lights can be diminished in situations where traffic is closely packed such that the signal lights pass out of the usual span of vision of a trailing vehicle's operator. Recently, this problem has been solved on new automobiles by providing additional signal lights, particularly brake lights, at higher elevations on the rear of the automobile, such as on the luggage compartment, on the roof, or inside the rear window. Still, most of the vehicles on the road today lack elevated rear signal lights. These vehicles would most likely continue on the road without auxiliary brake signals until signal devices are designed to fit and conveniently install on the various shapes of existing conventional vehicles.

SUMMARY OF THE INVENTION

The auxiliary signal light of this invention is designed to adhere to the inside of a vehicle window and may thus be used to provide an additional elevated brake light on conventional automobiles. The signal light disclosed has a housing which adjusts within a bracket to allow the user to vary the lens angle and to effectively use the light with many of the variously sloped windows seen in vehicle design. Preferably, the signal light may be conveniently connected to auto wiring either above or below the position of the light. The disclosed light may be conveniently assembled, repaired and adjusted by snapping together its interlocking parts and may be made inexpensively by molding resilient plastic materials. Other objects, advantages and features of the present invention will be apparent from the following specification when taken in conjunction with the accompanying drawings.

BRIEF DESCRIPTION OF THE DRAWINGS

FIG. 4 is an end view of the light housing of the brake light of FIG. 1.

FIG. 5 is a partial section view taken along section 5—5 of FIG. 4 showing the profile of the housing cup used for retaining the brake light housing in a selected position.

FIG. 6 is a section view taken through section 6—6 of FIG. 3 showing the interior of a bracket side fin.

FIG. 7 is a partial top view of the bracket side fin and tab shown in FIG. 6 used to secure the brake light housing in a selected position.

DESCRIPTION OF THE PREFERRED EMBODIMENT

Figure 1:
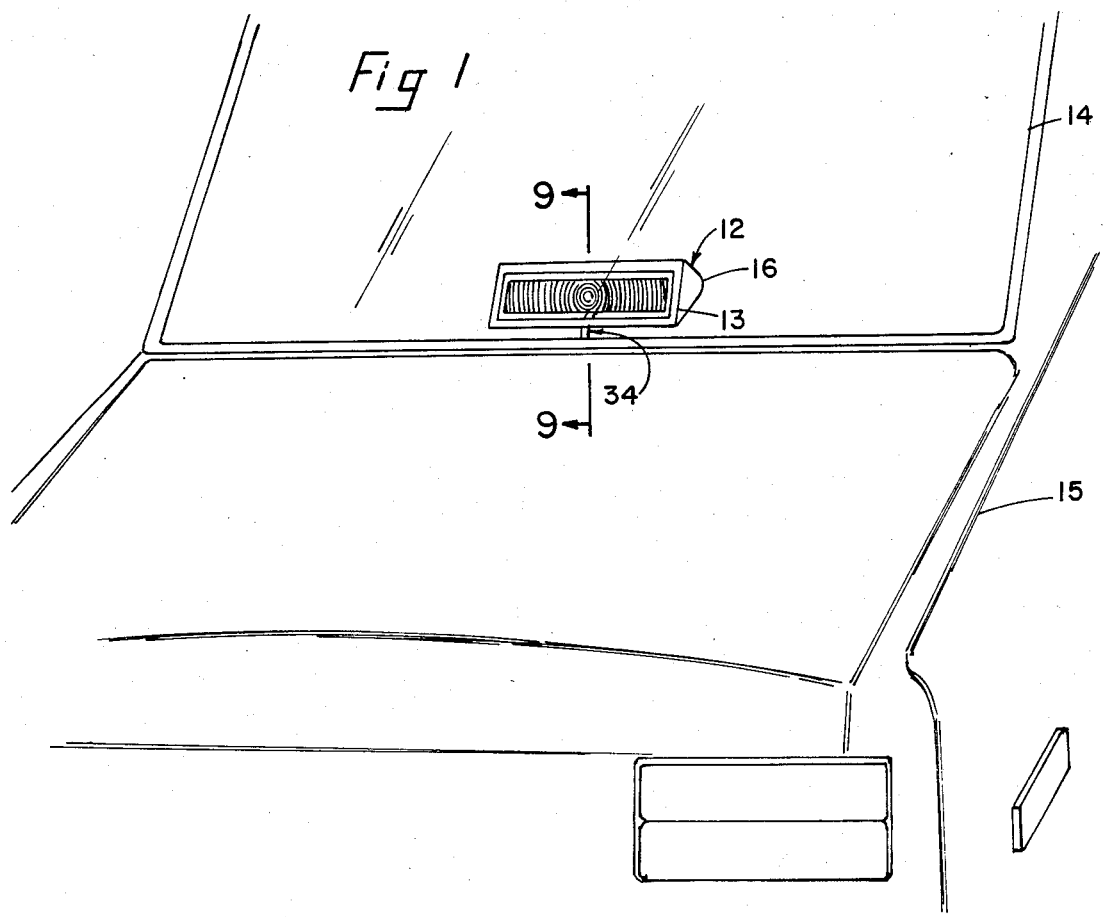
FIG. 1 is a perspective view through the window of a vehicle equipped with an auxiliary signal or brake light constructed in accordance with this invention.
Figure 2:
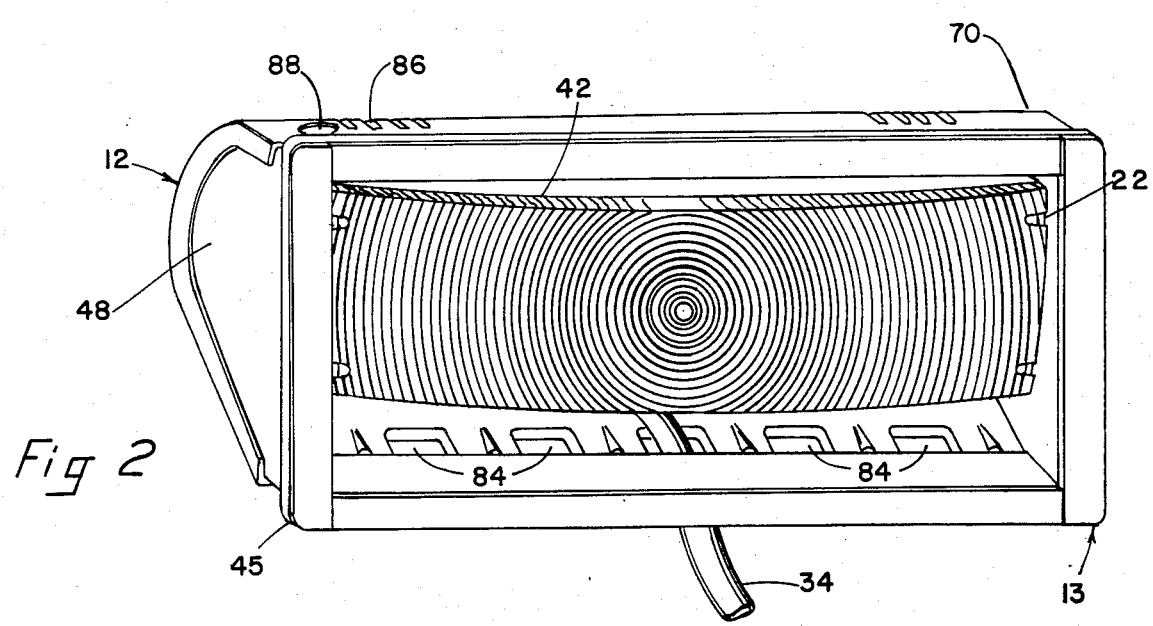
FIG. 2 is a more detailed perspective view of the preferred brake light of FIG. 1.
Figure 3:
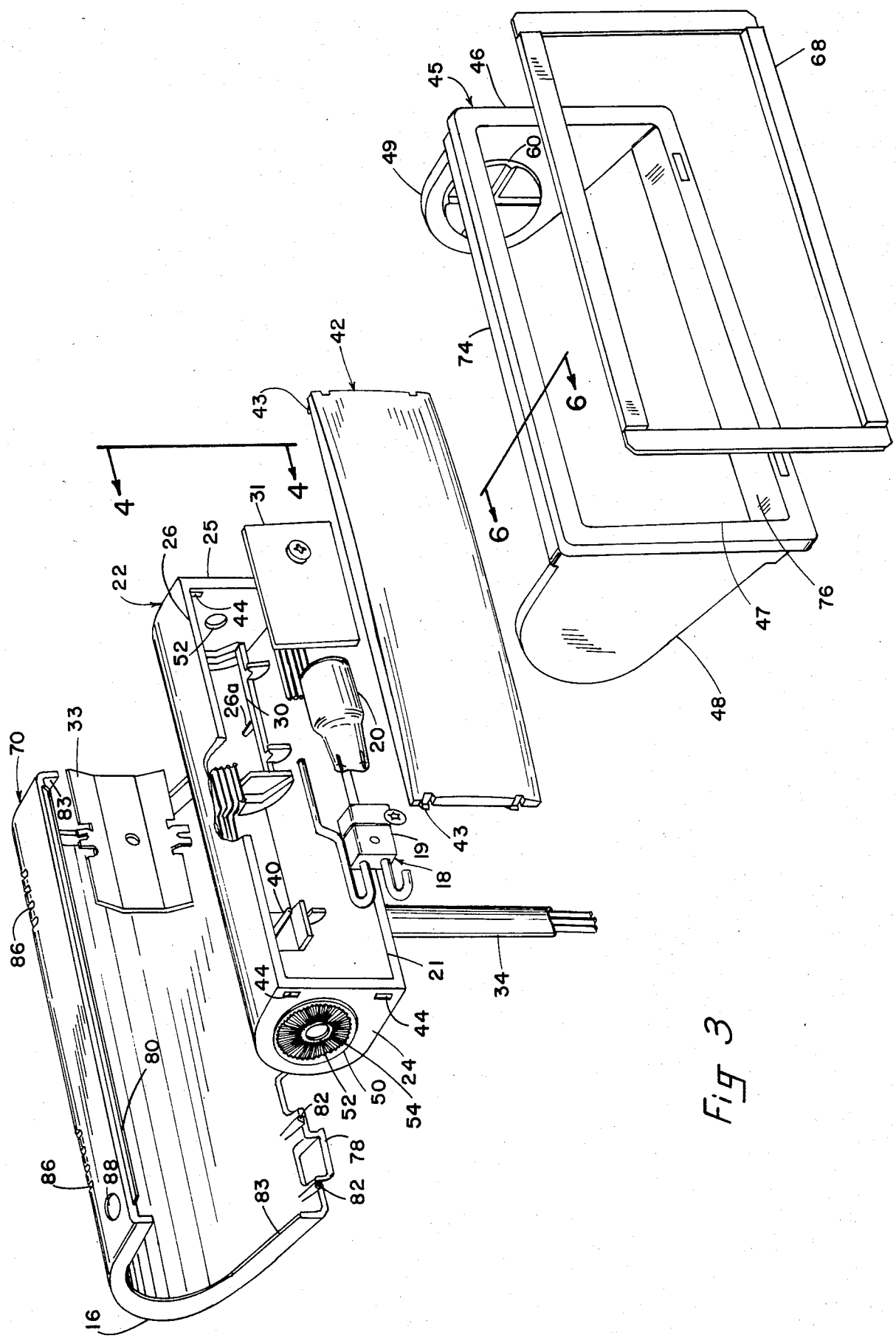
FIG. 3 is an exploded perspective view of the brake light of FIG. 1.

An auxiliary adjustable signal and brake light constructed in accordance with this invention is shown generally at 12 in FIG. 1 with its face 13 adhesively attached to the inside surface of the rear window 14 of a vehicle 15 and its body 16 extending into the passenger area of the vehicle. As best shown in FIG. 3, the adjustable signal light 12 includes a lamp 18 having a holder 19 and a bulb 20. The lamp 18 is designed to mount within the lamp chamber 21 of a housing 22. The housing 22 is molded from plastic and has opposed parallel side walls 24 and 25. A peripheral arcuate wall member 26 extends between the side walls 24 and 25 to define with them the lamp chamber 21. The lamp chamber 21 is open in a direction perpendicular to the side walls 24 and 25 to allow exit of light emitted by the bulb 20.

Figure 8:
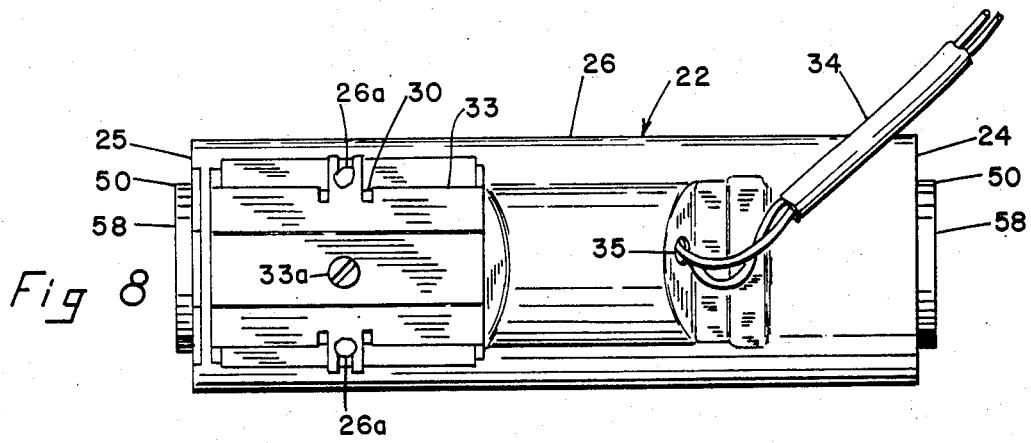
FIG. 8 is an elevation view of the housing of the brake light of FIG. 1, showing a heat sink mounted on the peripheral arcuate wall of the housing.

In the preferred embodiment, the arcuate wall member 26 has an opening 30 within which may be mounted an electrical circuit board with logic circuit. The board 31 is not required if the auxiliary brake light is to be installed in vehicles wherein separate bulbs and circuits are utilized for each vehicle brake light and turn signal light. However, if the auxiliary brake light is to be installed in vehicles which utilize a single bulb for a brake light and turn signal light (and four-way flasher light) a logic circuit is required to distinguish the electrical signals for the brake lights and four-way flashers (which must actuate the auxiliary brake light) from signals for the right or left turn signals (which should not actuate the auxiliary brake light). Conventional auxiliary brake lights do not usually enclose such logic circuits within their light housings because such circuits may be adversely affected by heat from the circuit and the lamp 18 if closely confined with the lamp 18. Accordingly, such circuits are usually mounted at some distance from the auxiliary brake light within the baggage compartment or elsewhere. In the preferred embodiment, as best shown in FIG. 8, an aluminum heat sink 33 is mounted within the opening 30 on mounting posts 26a extending outwardly from the arcuate wall member 26. The heat sink 33 substantially closes the opening 30 but provides a thermally conductive path for dissipating heat generated within the housing by silicon rectifiers and other heat producing components of the logic circuit, as well as by the lamp 18. If required, the circuit board 31 is preferably mounted on the heat sink 33 by mounting screw 33a threadedly engaged through the heat sink 33, as indicated in FIG. 3. The heat producing components of the logic circuit (not shown) may preferably be thermally connected to the heat sink 33 by direct contact or by other conventional means.

Wiring 34 is adapted to connect the lamp 18 to the electrical system of the vehicle 15 and passes out of the lamp chamber 21 to the electrical system through a hole 35 in the arcuate wall member 26. If the auxiliary brake light is equipped with a circuit board 31 and logic circuit, the wiring 34 will connect the circuit board 31 to the lamp 18 in a conventional manner. A lamp mount 40 is provided in the lamp chamber 21 to secure the lamp 18 in place. A translucent lens 42 is secured near the face of the housing 22 to substantially enclose the lamp 18 within the lamp chamber 21. Preferably, the lens 42 has resilient clips 43 adapted to reversibly engage slots 44 on the housing side walls 24 and 25 so that the lamp 18 may be accessed for maintenance.

As shown in FIG. 3 and FIG. 4, a receptacle 50 is affixed on the exterior surface of each side wall 24 and 25. The receptacles 50 each preferably include a generally planar base 51 with a center opening 52 and a plurality of teeth 54 exteriorally raised above the base and radially spaced about the center. The teeth 54 preferably have a triangular cross-section with the inclined sides of the adjacent teeth intersecting to form channels 56 between the teeth. The receptacle bases 51 are generally parallel to the side walls and the centers 52 of the two receptacles 50 are axially aligned such that the bases are generally perpendicular to a straight line passing through the two centers. The receptacles 50 of the preferred embodiment have peripheral rims 58 which surround the bases 51 and, as shown in FIG. 5, extend exteriorly therefrom a selected distance beyond the outermost extremity of the teeth 54. As previously indicated, the housing 22 is preferably a unitary piece of molded plastic, and the receptacles 50 are molded therein.

A bracket 45 is provided for adjustably mounting the housing 22 in position on the window 14. The bracket 45 includes a frame 46 with a frame opening 47 through which the lens 42 is visible from the face 13 of the adjustable signal light 12, and two opposed generally parallel side fins 48 and 49 which extend from the frame 46 on opposite sides of the frame opening 47. The side fins 48 and 49 are spaced apart sufficiently to allow the housing 22 to be positioned between them with the exteriors of the side walls 24 and 25 respectively adjacent to the interiors of the fins 48 and 49. Moreover, the side fins 48 and 49 are resilient such that they may be forced laterally away from the side walls 24 and 25, and they will snap back toward the side walls upon release.

A plate 60 is affixed or molded on the interior surface of each of the side fins 48 and 49. As shown in FIG. 6, each plate 60 has a central point 61 which is adapted to be aligned axially with the receptacle center openings 52 when the housing 22 is mounted within the bracket 45, and a plurality of tabs 62 of triangular cross-section which radiate from the central point 61 and are sized such that they are snugly received within radial channels 56 on the receptacles 50 of the adjacent side walls 24 and 25 when the housing 22 is engaged between the side fins 48 and 49, thereby holding the housing 22 in a first selected position within the bracket 45. The channels 56 and tabs 62 of this invention are sized such that when the fins 48 and 49 are laterally forced away from the side walls 24 and 25, the housing 22 may be selectively rotated about the common axis of the center openings 52. Upon release of the fins, the tabs will be received within adjacent aligned channels 56 with the housing held in another selected position within the bracket 45. Preferably, the receptacle bases 51 are circular; the channels 56 are of uniform dimensions and radially oriented about the base center openings 52; and the tabs 62 have dimensions generally corresponding to the dimensions of the channels to permit full engagement of the tabs within the channels. As best shown in FIG. 7, the plates 60 of the preferred embodiment have a recessed surface 64 extending between the tabs 62 and designed to fit within the rims 58 exteriorly from the teeth 54. The fit of the plates 60 within the receptacles 50 is improved in the preferred embodiment by sloping both the inside surface 59 of the rim 58, as shown in FIG. 5, and the peripheral edge 66 of the plates 60, as shown in FIG. 7.

The tabs 62 and the channels 56 which receive the tabs in multiple positions function together as a means for adjustably mounting the housing within the bracket such that the lens orientation may be adjusted. This adjustable mounting means is important for adapting the adjustable auxiliary vehicle light of this invention to the various vehicle models with which it might be used. This design also allows the housing 22 to be removeably mounted by conveniently snapping the side walls in and out of the bracket fins. Moreover, the user of the adjustable signal light 12 may adjust the orientation of the lens 42 by varying the particular channels in which the tabs 62 are positioned. The preferred channel and tab design used to achieve lens adjustability has been described above. However, other mating structural elements within the scope of this invention will be evident to those skilled in the art. Of course, the adjustment means need not include the preferred interlocking male and female members, but might utilize frictional contact, ball and detent, removeable locking pins or other equivalent means for selectively adjusting and securing the members in desired position.

Figure 9:
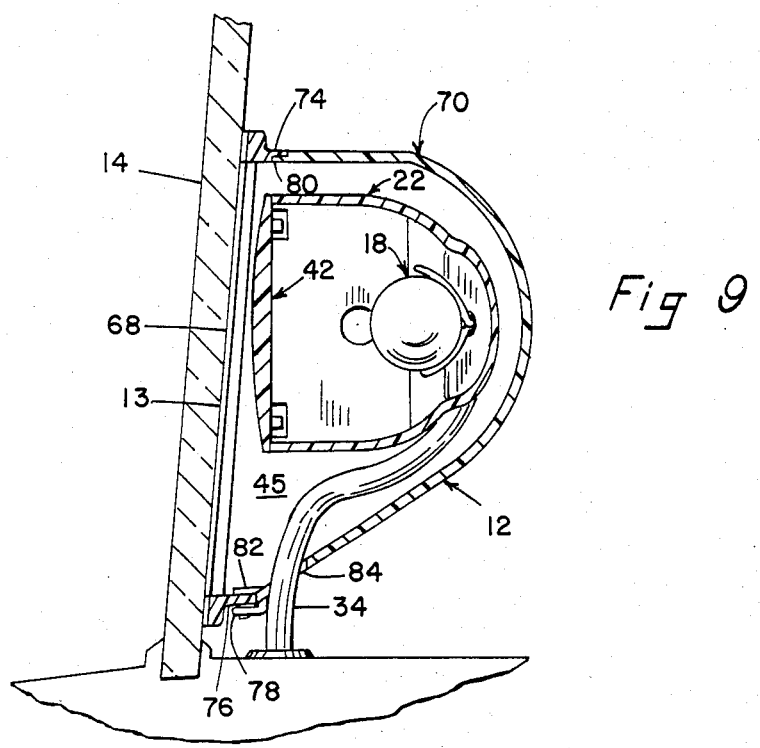
FIG. 9 is a section view of a brake light taken along section 9—9 of FIG. 1 constructed in accordance with this invention and adhered to the rear window of a conventional vehicle with the wiring connected from below the brake light.
Figure 10:
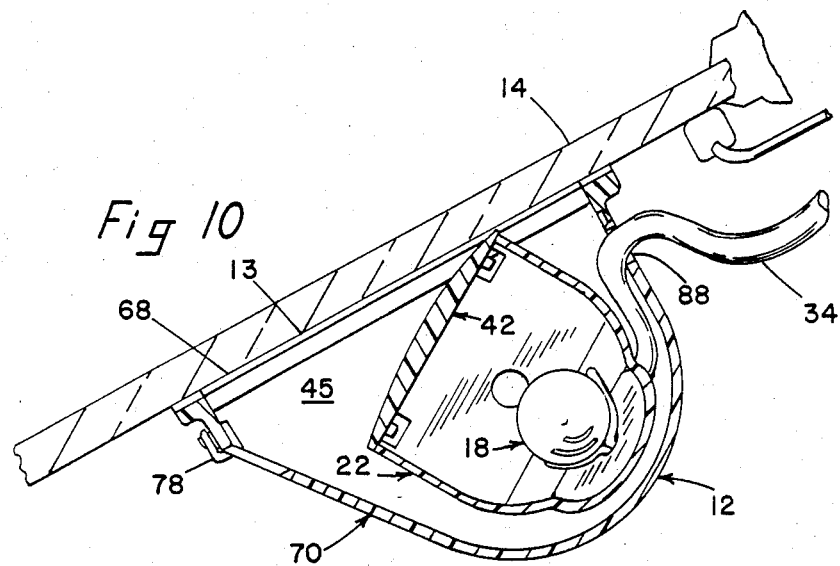
FIG. 10 is a section view of a brake light taken along a section analogous to section 9—9 constructed in accordance with this invention adhered to the rear window of a hatchback automobile with the wiring connected from above the brake light.

Adhesive means are provided for adhesively securing the face frame 46 to the window 14. As shown in FIG. 3, the preferred adhesive means includes an adhesive member 68 which is secured to the face of the frame 46 and, as illustrated in FIGS. 9 and 10, is adapted to adhesively bond to the window 14.

The preferred embodiment also includes a casing 70 which is positioned around the housing 22 so as to enclose and protect the housing against accidental readjustment. As shown in FIGS. 3 and 6, the bracket frame 46 has a top ledge 74 and a bottom ledge 76. FIG. 3 illustrates that the casing 70 has a top ridge 80 shaped to snugly engage the bracket top ledge 74; bottom fingers 82 shaped to snugly engage the bracket bottom ledge 76, and resilient bottom loops 78 adapted to removeably engage lugs 79 on the underside of the bottom ledge 76. Thus, the casing may be removeably locked snugly in position around the housing 22. The casing 70 preferably also has side flanges 83 adapted to engage the bracket side fins 48 and 49, thereby locking the side fins in engagement with the housing side walls 24 and 25 and substantially preventing the side fins from flexing outwardly and releasing the housing side walls when the cover 70 is fully engaged on the bracket 45. The casing has bottom holes 84 spaced between the fingers 82 through which the wires 34 may pass when the auxiliary adjustable signal light 12 is mounted above the rear deck of a conventional vehicle as shown in FIG. 9. Moreover, the bottom holes 84, together with the vents 86, provide for air circulation around the housing arcuate wall member 26. Alternately, a hole 88 may be provided or drilled through the top of the casing 70 for passage of the wires 34. This design is particularly useful for mounting the auxiliary adjustable signal light 12 to the window 14 of a hatchback vehicle as shown in FIG. 10, wherein the wires 34 may most suitably exit the top of the casing toward the roof of the vehicle.

The housing 22, the bracket 47 and the casing 70 may all be conveniently molded of resilient synthetic plastic material such as polycarbonate and the lens 42 may be made of translucent plastic such as polycarbonate. In particular polycarbonate marketed by General Electric under the trademark LEXAN is well suited for the molded plastic components of the brake light. The lens preferably includes multiple prism structures (not shown) on the lens inside surface which each refract light from the bulb filament and collectively project a bright light from the lens without need of a reflective surface around the lamp. If desired, reflective material may be mounted on or near the inside surface of the housing arcuate wall member 26, in parabolic fashion, to enhance the brightness of the light transmitted through the lens.

As disclosed above, all structural parts of the preferred embodiment may be removeably snapped together during construction and use. Even after the bracket 45 is adhesively bound to the vehicle window 14, the parts containing substantially all the electronic components of the preferred adjustable signal light 12 may be assembled, disassembled for repair, and reassembled with convenience at a location outside of the vehicle 15, and may then be snapped into place and mounted on the bracket.

While the particular materials, parts and methods of assembly disclosed are those of the preferred embodiment, it will be apparent that other materials, parts and modes of assembly are possible. It is understood that the present invention is not limited to the particular materials of construction and arrangement of parts illustrated and disclosed above. Instead, it embraces all such modified forms thereof as come within the scope of the following claims.

What is claimed is:

1. An adjustable auxiliary signal light which is attachable to the window of a vehicle comprising:
   (a) a bracket including a frame with a frame opening having a face, a first side fin which extends from the frame on one side of the frame opening, and a second fin which extends from the frame on the other side of the frame opening, wherein the side fins are resiliently secured on the bracket such that the side fins may be forced laterally apart and will snap back toward each other upon release;
   (b) a housing including a first side wall, a second side wall, and an arcuate wall member extending between the side walls to define a lamp chamber which is open in a direction perpendicular to the side walls, the housing side walls being engageable by and between the bracket side fins in adjustable relation with the lamp chamber open generally toward the frame opening at a desired angle thereto, wherein the means for adjustably mounting the housing within the bracket includes interlocking male and female members positioned on the exterior surface of the housing side walls and the interior surface of the bracket fins such that the male locking members will be received by the female locking members to hold the housing in adjustably selected positions in the bracket when the bracket side fins are released to engage the housing side walls; and wherein the female members include a first receptacle affixed to one of a first side wall and a first bracket side fin engaged therewith, and a second receptacle affixed to one of a second side wall and a second bracket side fin engaged therewith, each receptacle having a generally flat base with a center and a plurality of teeth raised above the base, radiating from the center in spaced relation, and separated by radial channels, the two receptable bases being generally planar and parallel and the two centers teing axially aligned such that the bases are generally perpendicular to a straight line passing through the two centers; and wherein the male members include a first plate fixed to the interior of the other of the first side wall and first bracket fin and a second plate fixed to the other of the second side side wall and second bracket side fin, each plate having a central point laterally aligned with the centers of the receptable bottoms and at least one tab sized such that it is snugly received within a selected channel of the adjacent receptacle thereby holding the housing in a first selected position within the bracket, and the channels and tabs also sized such that when the fins are laterally drawn away from the side walls, the housing is selectively rotated about an axis between the centers and the fins are released, the tabs will also be snugly received within the channels with the housing held in another selected position within the brackets;
   (c) a lamp mounted within the lamp chamber and reans for electrically connecting the lamp to the electrical system of a vehicle;
   (d) a lens secured to the housing to substantially enclose the lamp within the lamp chamber, and refract light from the lamp through the frame opening; and
   (e) means for securing the frame face to the inside surface of a vehicle window.

2. The adjustable auxiliary signal light of claim 1 wherein the receptacle bases are circular; wherein the channels are straight, of uniform dimensions, and are centered on the base centers; and wherein the tabs have dimensions generally equal to those of the channels to permit close engagement of the tabs within the channels.

3. The adjustable auxiliary signal light of claim 1 wherein each receptacle has a rim which surrounds its base and extends exteriorally therefrom to restrain the tabs.

4. The adjustable auxiliary signal light of claim 3 wherein the rims extend a selected axial distance beyond the outermost extremity of the teeth; wherein the height of the tab is generally equal to the height of the teeth; and wherein the plates have edges designed to fit snugly within the rims exteriorly from the teeth.

5. The adjustable auxiliary signal light of claim 3 wherein the interior surface of the rim and the edges of the plates are sloped.

6. The adjustable signal light of claim 1 wherein the receptacles are molded in a unitary manner with the housing.

7. The adjustable signal light of claim 1 wherein the housing, the bracket, the plates, the receptacles and the lens are molded from resilient plastic.

8. The adjustable signal light of claim 1 wherein the housing has a plane of substantial symmetry passing from face to rear through the receptacle centers such that the housing may be inverted within the bracket with the first side wall adjacent to the second fin and the second side wall adjacent to the first fin.

9. The adjustable signal light of claim 1 wherein a heat conductive metal heat sink is mounted on the housing arcuate wall member, and wherein a circuit board with at least one heat producing electrical component is mounted in the housing adjacent to the heat sink with the heat producing component connected in heat conductive relation to the heat sink whereby substantially all of the electronic components of the signal light are contained within the housing.

10. The adjustable signal light of claim 9 wherein the housing is removeable from the frame by resilient manipulation of the frame side fins without detachment of the frame from a vehicle window to permit the lens, lamp and electrical components to be disassembled, repaired and replaced, and reassembled at a location outside the vehicle.

11. The adjustable signal light of claim 9 wherein a casing is positioned around the housing and removeably secured to the bracket to protect the housing and electrical components, the casing having a plurality of vents to permit air circulation around the housing.

12. The adjustable auxiliary signal light of claim 1 wherein the adhesive means for securing the frame to the window includes an adhesive member which is secured to the frame face and is adapted to adhesively bind to the window of a vehicle.

13. An adjustable auxiliary signal light which is attachable to the window of a vehicle comprising:
(a) a bracket including a frame with a frame opening having a face, a first side fin which extends from the frame on one side of the frame opening, and a second fin which extends from the frame on the other side of the frame opening;
(b) a housing including a first side wall, a second side wall, and an arcuate wall member extending between the side walls to define a lamp chamber which is open in a direction perpendicular to the side walls, the housing side walls being engageable by and between the bracket side fins in adjustable relation with the lamp chamber open generally toward the frame opening at a desired angle thereto;
(c) a lamp mounted within the lamp chamber and means for electrically connecting the lamp to the electrical system of a vehicle;
(d) a lens secured to the housing to substantially enclose the lamp within the lamp chamber, and refract light from the lamp through the frame opening;
(e) means for securing the frame face to the inside surface of a vehicle window.
(f) a casing positioned around the housing and removeably secured to the bracket so as to substantially lock the bracket side fins in engagement with the housing side walls and protect the housing against accidental readjustment within the bracket.

14. The adjustable auxiliary signal light of claim 13 wherein the side fins are resiliently secured on the bracket such that the side fins may be forced laterally apart and will snap back toward each other upon release; and wherein the means for adjustably mounting the housing within the bracket includes interlocking male and female members positioned on the exterior surface of the housing side walls and the interior surface of the bracket fins, such that the male locking members will be received by the female locking members to hold the housing in adjustably selected positions in the bracket when the bracket side fins are released to engage the housing side walls.

15. The adjustable signal light of claim 13 wherein the bracket frame has a top ledge and a bottom ledge, and wherein the casing has resilient locking means for engaging the bracket top ledge and bottom ledge and securing the casing on the bracket in removeable relation.

16. The adjustable signal light of claim 13 wherein the casing, the housing, and the bracket are molded from resilient plastic.

17. The adjustable signal light of claim 13 wherein the casing has bottom holes and rear vents to provide air circulation around the housing arcuate wall member.

18. An adjustable auxiliary signal light adapted to be attached to the window of a vehicle, comprising:
(a) a housing including a first side wall, a second side wall generally parallel to the first side wall, and an arcuate wall member extending between the side walls to define an interiorally positioned lamp chamber which is open in a direction perpendicular to the side walls, said housing containing substantially all the electronic components of the signal light;
(b) a lamp mounted within the lamp chamber and adapted to connect to the electrical system of the vehicle;
(c) a translucent lens secured to the housing to substantially enclose the lamp within the lamp chamber;
(d) a bracket including a frame with a frame opening, a first side fin which extends from the frame on one side of the frame opening, and a second fin which extends from the frame on the other side of the frame opening and substantially parallel to the first side fin, said side fins being resiliently secured on the bracket such that the side fins may be forced laterally apart and will snap back toward each other upon release;
(e) means for removeably mounting the housing in adjustably selected position within the bracket by engagement of the side walls by the bracket fins, such that the lamp and substantially all the electronic components may be assembled, disassembled and repaired with convenience at a location outside the vehicle;
(f) means for securing the frame to the window of a vehicle.

19. The adjustable signal light of claim 18 further including a casing positioned around the housing and removeably secured to the bracket so as to substantially lock the bracket side fins in engagement with the housing side walls and protect the housing against accidental readjustment within the bracket.

20. An adjustable auxiliary signal light adapted to be attached to the window of a vehicle, comprising:
  (a) a molded housing of synthetic plastic including a first side wall, a second side wall generally parallel to the first side wall, and an arcuate wall member extending between the side walls to define an interiorly positioned lamp chamber which is open in a direction perpendicular to the side walls;
  (b) a lamp mounted within the lamp chamber and adapted to connect to the electrical system of the vehicle;
  (c) a first receptacle molded in unitary manner into the exterior of the first side wall and a second receptacle molded in unitary manner into the exterior of the second side wall, each receptacle having a generally flat circular base with a center and a plurality of uniform teeth exteriorly raised above the base, radiating from the center in uniformly spaced relation to define channels therebetween, each receptacle having a rim which surrounds the base and extends exteriorally therefrom a selected distance beyond the outermost extremity of the teeth, the two receptacle bases being generally planar and parallel to the side walls and the two centers being axially aligned such that the bases are generally perpendicular to a straight line passing through the two centers;
  (d) a molded bracket of synthetic plastic including a frame with a frame opening, a first side fin which extends rearward of the frame on one side of the frame opening, and a second side fin which extends rearward of the frame on the other side of the frame opening and substantially parallel to the first side fin, said side fins being resiliently secured on the bracket such that the side fins may be forced laterally apart and will snap back toward each other upon release;
  (e) a first plate fixed to the interior of the first side fin and a second plate fixed to the interior of the second side fin, each plate having a central point which may be laterally aligned with the centers of the receptacle bottoms when the housing is positioned within the bracket, and at least one tab having dimensions generally equal to the radial channels of the side wall receptacles such that it may be snugly received within a channel of the adjacent receptacle thereby holding the housing in a first selected position within the bracket, and such that when the fins are laterally forced away from the side walls, the housing is selectively rotated about an axis between the centers and the fins are released, the tab will be snugly received within a channel with the housing held in another selected position within the brackets, and each plate also having an edge designed to fit snugly within the rims exteriorally from the teeth;
  (f) a translucent lens of tinted synthetic plastic secured to the housing to substantially enclose the lamp within the lamp chamber, the lens being positioned to refract light from the lamp through the frame opening;
  (g) a molded casing of synthetic plastic positioned around the housing and removeably secured to the bracket so as to protect the housing against accidental readjustment; and
  (h) an adhesive member secured to the frame and adapted to adhesively engage the window of the vehicle to support the signal light thereon.

* * * * *